F. M. WILLIAMSON.
FERTILIZER SPREADER.
APPLICATION FILED SEPT. 18, 1913.
1,116,659.
Patented Nov. 10, 1914.
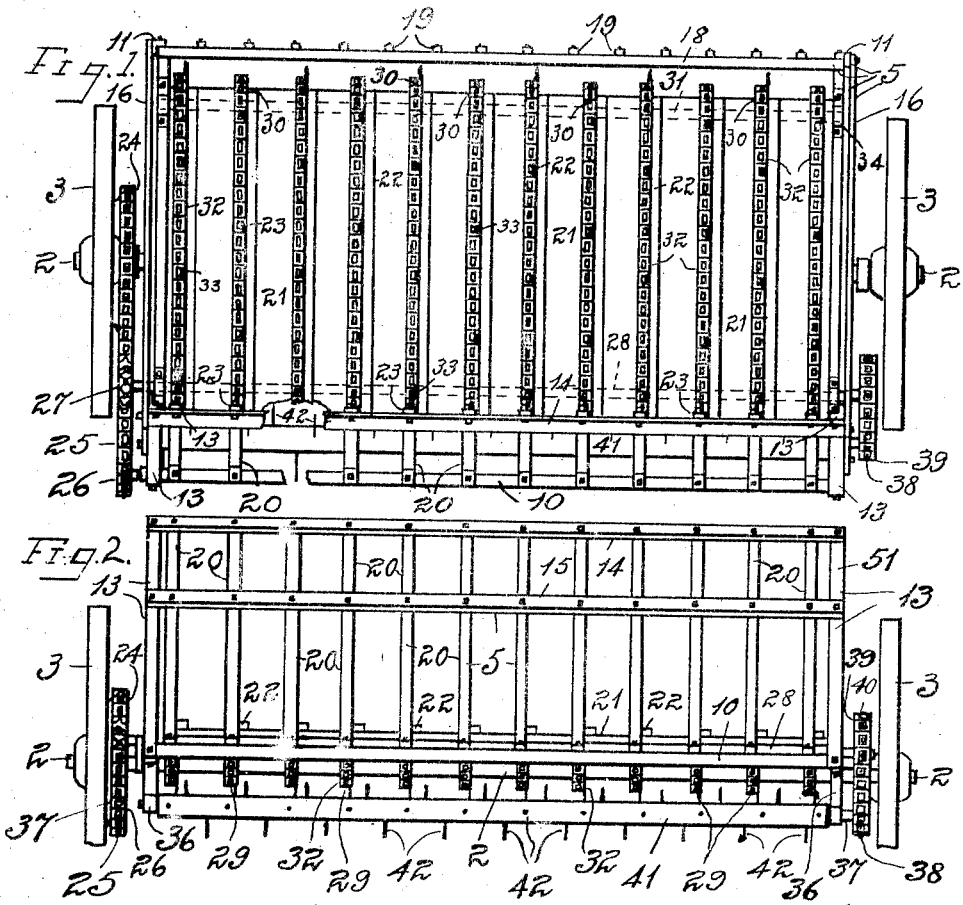
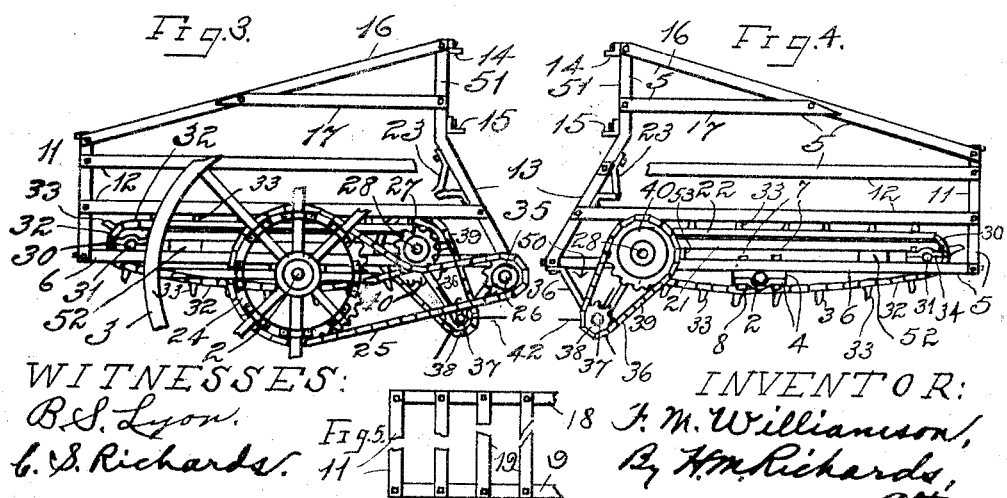

UNITED STATES PATENT OFFICE.

FRANCIS M. WILLIAMSON, OF GALESBURG, ILLINOIS.

FERTILIZER-SPREADER.

1,116,659.  Specification of Letters Patent.  Patented Nov. 10, 1914.

Application filed September 18, 1913. Serial No. 790,475.

*To all whom it may concern:*

Be it known that I, FRANCIS M. WILLIAMSON, a citizen of the United States, and a resident of Galesburg, in the county of Knox and State of Illinois, have invented a new and useful Fertilizer-Spreader, of which the following is a specification.

My invention relates to machines for spreading or distributing fertilizers and mulches, and while it is especially adapted for spreading the various kinds of straw, it will be evident, upon the nature of the invention being further disclosed and more fully understood that it is capable of successfully distributing manure and other fertilizers.

One of the main objects of the invention is to provide a suitable hopper into which the fertilizer is thrown by the operator from a wagon in advance of the spreader and by which wagon the latter is drawn, the hopper frame supporting or including a table or floor over which travels the feeding mechanism.

Another object is to provide a retarding board for preventing the straw being thrown too far rearwardly, or over the hopper.

It is an object to provide straw-deflecting fingers, which aid in delivering to the discharge opening the straw which would otherwise lodge against the rear end of the hopper.

It is another object to provide a discharge opening of novel character.

Numerous minor objects will hereinafter appear, some of which will be obvious and some of which will be specifically pointed out.

For the purpose of illustrating the nature of my invention, I have in the accompanying drawings shown that form thereof which is at present preferred by me, since the same has in the field given satisfactory results. However, it is to be understood that the several instrumentalities of which the invention consists can be variously arranged and organized, that some may be used without the others, and that I do not contemplate the scope thereof as limited to the structure shown and described, but consider it as covering all such changes as fairly fall within the general idea thereof, considered in its broadest aspect.

In said drawings,—Figure 1 is a top plan; Fig. 2, a rear elevation; Fig. 3, an elevation seen from the left hand side; Fig. 4, a similar view, seen from the right hand side; and Fig. 5, a fragmental detail of the hopper front.

Considering said drawings in detail, and referring to each element and part thereof, where required, by a distinguishing reference character, uniformly employed in the several figures, 2 designates an axle supported on traction wheels 3 and mounted in pairs of elongated axle bearings 4.

5 designates a hopper or straw-receiving frame, the side bars 6 of which are secured by bolts 7 and nuts 8 to the bearings 4, as shown best in Fig. 4.

9 designates the lower front frame-bar, and 10 the rear one.

11, 11 designate the front corner standards, to which are secured slats 12, the rear ends of which are suitably secured to rear corner standards 13, the lower ends of which are rearwardly inclined and the upper portions 51 of which are preferably vertically arranged.

14, 15 designate cross bars.

16, 16 are diagonally arranged side frame-bars connected to the standards 11 and 13, and 17, 17 are side frame bars connected to the bars 16 and standards 13.

18 indicates the upper front frame-bar, suitably secured to the posts 11, and 19, 19 indicate slats secured at their ends to the frame bars 9 and 18.

20, 20 designate slats, bent to conform in shape to the standards 13.

21 is the hopper table or floor supported on a pair of transverse frame-bars 52—53, the ends of which bars are supported on the bars 6.

22, 22 designate ribs lying one alongside each feed chain, (presently described,) which chains they serve to guide.

23, 23 are anti-packing or straw-deflecting fingers, one fixed to each slat 20. The fingers shown are substantially rectangular in shape, having bent terminals by which they are secured to said slats, and are preferably formed from rods of iron. They may, however, be of any suitable form and construction.

Fixed on the left hand wheel 3 is a driving sprocket 24. A sprocket chain 25 embraces this sprocket and an idler 26 fixed on a shaft 35 journaled in a bearing in the rear end of the frame 5, and its flight engages a sprocket pinion 27 on a shaft 28 which drives a plurality of sprocket wheels 29.

30 designates each one of a series of idler sprockets fixed on a shaft 31 journaled in bearings 34 at the forward corners of the frame 5.

32 designates each one of a series of feed chains traversing the sprockets 29 and 30 and which are driven by the shaft 28. Each chain 32 is provided with feed fingers 33.

At the right hand end of the machine is a bracket 36 suitably secured to the frame 5 and having at its lower end a bearing in which is journaled a shaft 37 which is driven by a sprocket pinion 38 which derives its motion from a chain 39 which embraces said pinion and a driving sprocket 40 which is fixed on and driven by the shaft 28. A beater-roller 41 is secured on the shaft 37 and is provided with beaters 42.

The spreader is to be suitably connected to and drawn by and in rear of a wagon which carries a load of straw or other fertilizer. Standing on said load the operator will pitch the straw into the hopper. Falling onto the chains 32 and teeth 33 it will be carried rearwardly thereby and discharged through the opening 50 onto the beaters 42 which will shred and properly spread it. The portions 13 and 20 of the frame 5 provide a pitching or retarding board against which the straw may be pitched by the operator. The straw-deflecting fingers 23 will, when the operator is feeding the machine, deflect the straw and direct it back onto the chains, and thus prevent it piling at the mouth of and clogging the discharge opening This packing would be caused by the rearwardly inclined lower portions of the standards 13 and slats 20, against which a portion of the straw is thrown by the operator. Also, the chain fingers 33 operate mainly on the lower portion of the charges when said charges meet an obstruction, and were it not for these forwardly projecting fingers, (from which the fertilizer thrown against them will fall quite a distance forwardly of the point on which it would drop were they not present,) the straw would "bunch" and pack intermediate the slats 20 and the rear flights of the feed chains and thus prevent successful operation, for the feed fingers would merely tear through said lower portion without carrying it off. It is to be noted that their forward portions are substantially vertical to the rearmost portions of the chains 32, and that when the straw begins to "bunch" it will be deflected by said fingers forwardly from the pitching board and onto said table and feed-chains.

Having thus described my invention, I claim as new and desire to secure by Letters Patent the following, to-wit:

1. Combined in a fertilizer spreader, a hopper including a table and a pitching board, said hopper having a discharge opening at its rear portion, a plurality of feed means working rearwardly on said table and adapted to discharge their load into said opening, and anti-packing fingers secured on said pitching board and adapted to prevent clogging the feed opening.

2. Combined in a fertilizer spreader, a hopper including a table and a pitching board, said hopper having a discharge opening at its rear portion, means working rearwardly on said table to discharge a load into said opening, straw-deflecting fingers, and means for beating the load discharged from said discharge opening.

3. Combined in a fertilizer spreader, supporting wheels, an axle carried thereby, a frame including a table and a pitching board carried by said axle, fertilizer-carrying chains traversing said table, means actuated by a supporting wheel for driving them, beaters arranged to disseminate the fertilizer discharged by said chains, and driven from said supporting wheels, and fingers for deflecting the straw from said pitching board.

4. Combined in a fertilizer spreader, a frame including a table and a pitching-board having a rearwardly inclined lower portion, said frame provided with a discharge opening, fertilizer-deflecting and anti-packing fingers secured on said board, and feed-chains traversing said table and adapted to receive the straw deflected by said fingers.

5. Combined in a fertilizer spreader, a frame including a table and a pitching board having a rearwardly inclined lower portion, feed-chains traversing said table, and anti-packing fingers secured on the inclined portion of said board, the inclination and arrangement of said board with reference to said table and chains providing a discharge opening of large size.

In testimony whereof, I hereunto sign my name this 12th day of September, 1913.

FRANCIS M. WILLIAMSON.

Witnesses:
Jas. A. McKinney,
H. M. Richards.

Copies of this patent may be obtained for five cents each, by addressing the "Commissioner of Patents, Washington, D. C."